Oct. 24, 1967 J. E. WISER 3,348,423
TRANSMISSION DEVICE FOR A TIMER
Filed Sept. 27, 1965

INVENTOR
JOSEPH E. WISER
BY Robert Levine
ATTORNEY

United States Patent Office 3,348,423
Patented Oct. 24, 1967

3,348,423
TRANSMISSION DEVICE FOR A TIMER
Joseph E. Wiser, Indianapolis, Ind., assignor to P. R. Mallory & Co. Inc., Indianapolis, Ind., a corporation of Delaware
Filed Sept. 27, 1965, Ser. No. 490,278
9 Claims. (Cl. 74—424.5)

ABSTRACT OF THE DISCLOSURE

In a time sequence switch an axially and rotatably displaceable spiral gear means including a spiral gear having an Archimedes' spiral tooth formed thereon. The spiral tooth has an axis common with that of the gear itself. The spiral gear is disposed at substantially a right angle with respect to a gear means driven thereby. An escapement means is connected to the gear means and translates the substantially constant rotary motion of the gear means to an intermittent rotary motion output. A cam-carrying shaft is connected to the intermittent rotary motion output of the escapement and is intermittently displaced in determined increments by the escapement.

---

The present invention relates to transmission devices for timers and more particularly to the means and method for providing a spiral gear drive for transmitting rotary motion.

Within the broad field of timers and control devices, there are many requirements for coupling a driving means to rotating elements of said timers and control devices wherein the rotational speed is to be reduced and the output torque is to be increased. The reason for this requirement is that usually a small, inexpensive, and high speed motor is used as the driving means and that the rotating elements must be turned relatively slow in order to increase the timing capacity.

Accordingly, the present invention provides a novel, efficient, and economical solution to the aforementioned coupling requirements. There is presented a spiral gear drive that has a speed reduction and torque amplifying capability equivalent to a typical worm and worm gear stage and that is easy to engage and disengage.

It is an object of the present invention, therefore, to provide a means for coupling a driving means to rotating elements of a timer.

It is still a further object to provide a spiral gear and a driven gear for coupling a driving means to rotating elements of a timer.

It is still a further object to provide a rotatable member having a convoluted face and a gear engaged therewith so as to rotate a frequency determined by the geometry of said convoluted face.

It is still another object to provide a spiral gear drive wherein the spiral gear has a constant pitch spiral tooth formed thereon, said spiral tooth having a common axis with said gear.

It is still another object of the present invention to provide a spiral gear drive wherein the spiral gear has an Archimedes' spiral tooth formed thereon, said spiral tooth having a common axis with said gear.

It is still another object of the present invention to provide a spiral gear drive having a spiral gear and a driven gear and a means for engaging said spiral gear with said driven gear.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is a transmission means comprising: a member having a face substantial normal to a rotating axis therefor, said face having a constant pitch spiral tooth formed thereon, said spiral tooth having a common center with said rotating axis; a gear engaged with said member so as to rotate at a frequency determined by said constant pitch.

In a timer, the invention would be a transmission means for coupling a driving means to rotating elements of said timer comprising: a member mounted on a shaft of said driving means so as to be rotated thereby, said member having a face substantially normal to said shaft with a constant pitch spiral tooth formed thereon, said spiral tooth having a common axis with said shaft; a gear for driving said rotating elements; and a means for engaging said member with said gear, whereby said gear has a rotational speed determined by said constant pitch.

Figure 1:
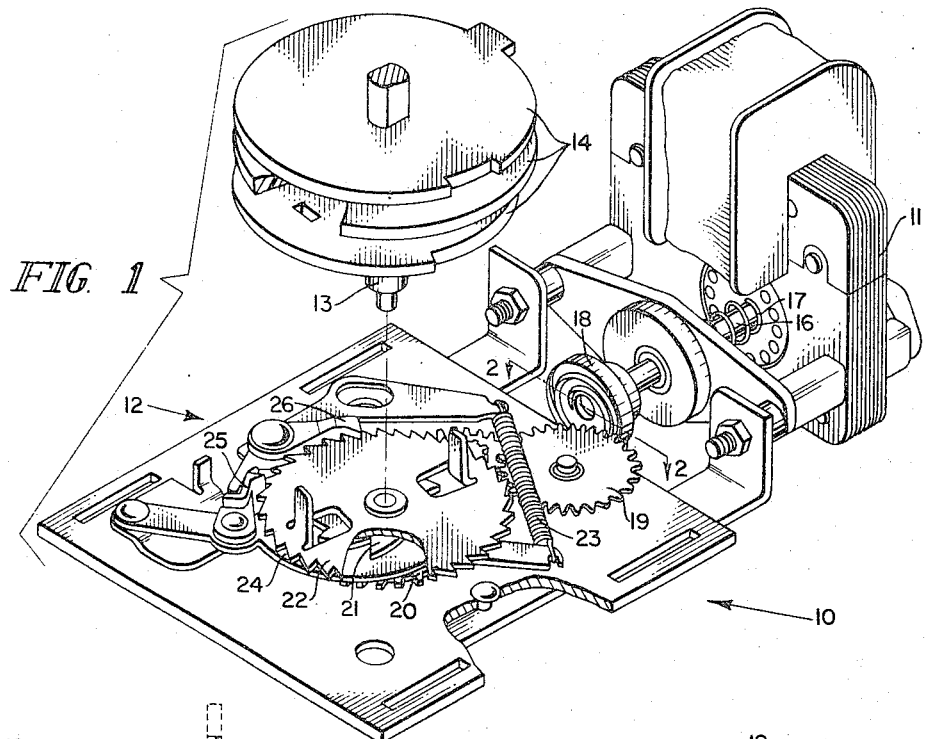
FIGURE 1 is an exploded perspective view of a timer showing an application of the spiral gear drive of the present invention.

Referring now to the drawing, and particularly to the exploded perspective view of FIGURE 1, the component parts of this invention can be visualized in conjunction with the following description. The timer 10 is shown in FIGURE 1 as one application for the spiral gear drive of the present invention. As stated previously, the spiral gear drive can be used in a wide variety of transmission applications and is, therefore, not limited to timing functions. It is believed, however, that the timer 10 application is a very practical and novel application of the present invention.

The timer 10 comprises a driving means, hereinafter referred to as the motor 11, an escapement mechanism 12, a camshaft 13, a plurality of cams 14 mounted on said camshaft so as to be rotated thereby, and a plurality of control switches 15, not shown in FIGURE 1, operated by said cams. The motor 11 can be any suitable motor such as the shaded-pole motor shown in FIGURE 1. A useful feature of the shaded-pole motor, shown in FIGURE 1, is the solenoid action of the shaft 16 when the motor 11 is energized. That is, when the motor 11 is energized, the shaft 16 moves axially in the direction of the escapement mechanism 12 to cause the spiral gear 18 to engage the driven gear 19. When the motor 11 is deenergized, the spring 17 returns the shaft 16 to its original position and disengages the spiral gear 18 from the driven gear 19. Hence, the coast down of the motor 11 after it is de-energized will not tend to overdrive the escapement mechanism 12.

The escapement mechanism 12 comprises a gear 20, cam 21, ratchet 22, spring 23, cam follower 24, drive pawl 25, and backup pawl 26. There is a pinion gear 27, not shown in FIGURE 1, affixed to the driven gear 19 and adapted to rotate the gear 28 and pinion 29 stage which drives the gear 20 of the escapement mechanism 12. The operation of an escapement mechanism 12, such as that shown in FIGURE 1, is old in the timer art and need not be discussed in this application. It will suffice to say that the escapement mechanism is a means for imparting a time driven, snap action rotational motion to the camshaft 13 of the timer 10.

Figure 2:
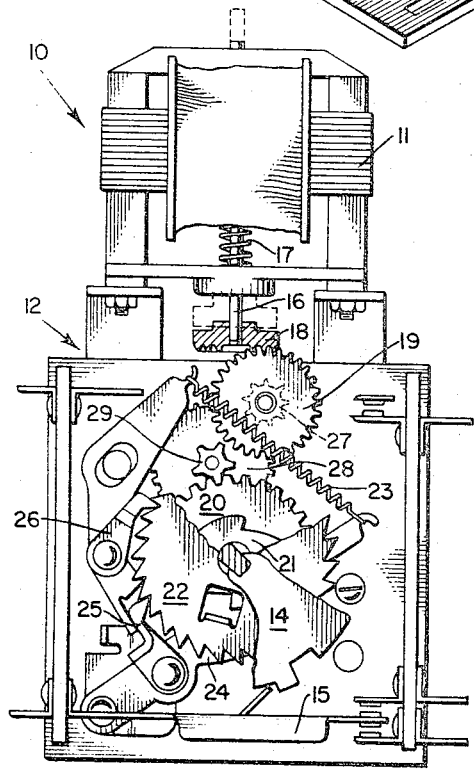
FIGURE 2 is a fragmentary top view of the timer showing the spiral gear of the present invention engaging a gear of the escapement mechanism of said timer and including a sectional view 2—2 taken from FIGURE 1.

Referring now to FIGURE 2, we see a fragmentary top view of the timer 10 showing the various components of the escapement mechanism 12 and the axial movement of the shaft 16, said axial movement being shown by the dotted outline of the spiral gear 18 and said shaft. The solenoid acting motor 11 is one means for engaging the spiral gear means 18 with the gear 19, whereby said gear 19 will advance one tooth-space for each revolution of said spiral gear means 18.

Figure 3:
FIGURE 3 is a face view of a spiral gear showing a single Archimedes' spiral.

Referring now to FIGURE 3, we see the face view of the spiral gear 18 showing a single Archimedes' spiral as it develops from near the center of said gear towards the outer edge. The form of the spiral is substantially that of a spur gear tooth as will be seen in FIGURE 5. The essential requirement is that the spiral must have a constant pitch, or distance between loops, as it does in an Archimedes' spiral and that it must have a common axis with the rotating axis of the gear or the shaft supporting the gear. The spiral gear 18 will be referred to in this specification as a constant pitch spiral gear or a member having a convoluted face.

Figure 4:
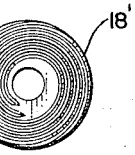
FIGURE 4 is a face view of a spiral gear showing a double Archimedes' spiral.

Referring now to FIGURE 4, we see a face view of the spiral gear 18' showing a double Archimedes' spiral as it develops from near the center of said gear toward the outer edge. The double Archimedes' spiral can be used in lieu of the single Archimedes' spiral when considerably less torque is to be transmitted and less speed reduction is required.

Figure 5:
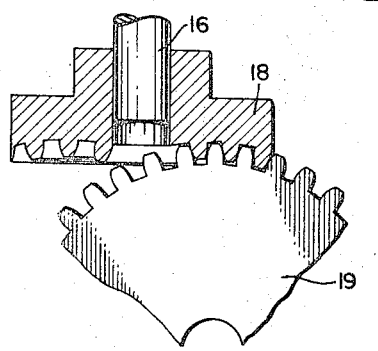
FIGURE 5 is an enlarged view of that portion of FIGURE 2 showing how the tooth of the spiral gear engages the teeth on the driven gear.

Referring now to FIGURE 5, we see a sectional view 5—5, taken from FIGURE 1, showing how the spiral gear 18 engages the driven gear 19. It can be seen that the face of the spiral gear 18 is formed so that the portion that engages the driven gear 19 is concave at a radius approximately equal to the radius of the driven gear 19. The purpose of the concave face is to assure uniform engagement of the spiral gear 18 with the driven gear 19.

With the above description of components in mind, and by making reference to the drawing figures, the following analysis of operation will serve to convey the functional details of the present invention. Referring again to FIGURE 5, we can see that a complete revolution of the spiral gear 18 will advance the driven gear 19 one tooth-space. This reduction rate is analogous to a simple worm and worm gear stage. The advantage of the spiral gear over a worm gear is that the spiral gear can be readily disengaged from the driven gear by a simple axial motion. The axial motion can be obtained by a solenoid action motor such as the motor 11 shown in FIGURE 1 and FIGURE 2.

Referring again to FIGURE 1, we can see that the spiral gear drive mechanism of the present invention drives the escapement mechanism 12. The camshaft 13 is coupled to the ratchet 22 of the escapement mechanism 12 so as to be rotated thereby. The cams, which are mounted on the camshaft 13, are rotated by said camshaft to operate the control switches 15, not shown in FIGURE 1, thereby providing an electrical output to control elements of an appliance. The speed of the motor 11 is reduced by the spiral gear drive and further reduced by the pinion 27 coupled to the driven gear 19, the gear 28 and pinion 29 stage, and the gear 20.

In a timer, or any other control device or mechanism, the spiral gear drive of the present invention is a transmission means for coupling a driving means to rotating elements of said timer or said contact device or mechanism.

The transmission means of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. In a time sequence switch for accomplishing a plurality of timing sequences, a drive motor providing a substantially constant rotary motion output including rotor means displaced from the stator means by bias means so that energization of said motor causes said rotor means to be displaced to a determined position with respect to said stator means, spiral gear means carried by said rotor means including at least one Archimedes' spiral tooth formed thereon having an arcuate extent in excess of 360 degrees, said spiral tooth having a common axis with said rotor means, said spiral tooth engaging with a plurality of teeth of and rotatably driving gear means after displacement of said rotor means with respect to said stator means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

2. In a time sequence switch for accomplishing a plurality of timing sequences, a drive motor providing a substantially constant rotary motion output including rotor means displaced from the stator means by bias means so that energization of said motor causes said rotor means to be displaced to a determined position with respect to said stator means, spiral gear means carried by said rotor means including at least one Archimedes' spiral tooth formed thereon having an arcuate extent in excess of 360 degrees, said spiral tooth having a common axis with said rotor means, said spiral tooth engaging with at least two teeth of and rotatably driving gear means after displacement of said rotor means with respect to said stator means, one revolution of said spiral gear advancing said gear means one tooth space of said gear means, an escapement means connected to said gear means for translating said substantially constant rotary motion of said gear means to an intermittent rotary motion output, and a cam-carrying shaft connected to said intermittent rotary motion output of said escapement intermittently displaced in determined increments by said escapement.

3. In a time sequence switch for accomplishing a plurality of timing sequence, a drive motor providing a substantially constant rotary motion output including rotor means displaced from the stator means by bias means so that energization of said motor causes said rotor means to be displaced to a determined position with respect to said stator means, spiral gear means carried by said rotor means including at least one Archimedes' spiral tooth formed thereon having an arcuate extent in excess of 360 degrees, said spiral tooth having a common axis with said rotor means, gear means disposed at substantially a right angle with respect to said spiral gear means, said spiral tooth engaging with at least two teeth of and rotatably driving gear means after displacement of said rotor means with respect to said stator means, one revolution of said spiral gear advancing said gear means one tooth space of said gear means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

4. In a time sequence switch for accomplishing a plurality of timing sequences, a drive motor driving a substantially constant rotary motion output including rotor means displaced from the stator means by spring bias means so that energization of said motor causes said rotor means to be displaced to a determined position with respect to said stator means, spiral gear means carried by said rotor means including at least one Archimedes' spiral tooth formed thereon having an arcuate extent in excess of 360 degrees, said spiral tooth having a common axis with said rotor means and having a rotational speed determined by the pitch of said spiral tooth, gear means disposed at substantially a right angle with respect to said spiral gear means, said spiral tooth engaging with at least two teeth of and rotatably driving gear means after displacement of said rotor means with respect to said stator means, one revolution of said spiral gear advancing said gear means one tooth space of said gear means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

5. In a time sequence switch for accomplishing a plurality of timing sequences, a drive motor providing a substantially constant rotary motion output including rotor means displaced from the stator means by spring bias means so that energization of said motor causes said rotor means to be displaced to a determined position with respect to said stator means, spiral gear means carried by said rotor means having a concaved face including at least one Archimedes' spiral tooth formed thereon having an arcuate extent in excess of 360 degrees, said spiral tooth having a common axis with said rotor means and having a rotational speed determined by the pitch of said spiral tooth, gear means disposed at substantially a right angle with respect to said spiral gear means, said spiral tooth engaging with at least two teeth of and rotatably driving gear means after displacement of said rotor means with respect to said stator means, said concaved face of said spiral gear means meshing uniformly with said gear means so as to substantially prevent crowning of said gear means, one revolution of said spiral gear advancing said gear means one tooth space of said gear means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

6. In a time sequence switch for accomplishing a plurality of timing sequences, a drive motor providing a substantially constant rotary motion output including rotor means displaced from the stator means by spring bias means so that energization of said motor causes said rotor means to be displaced to a determined position with respect to said stator means, spiral gear means carried by said rotor means having a concaved face including at least one Archimedes' spiral tooth formed thereon having an arcuate extent in excess of 360 degrees, said spiral tooth having a common axis with said rotor means and having a rotational speed determined by the pitch of said spiral tooth, gear means disposed at substantially a right angle with respect to said spiral gear means, said spiral tooth engaging with a plurality of teeth of and rotatably driving gear means after displacement of said rotor means with respect to said stator means during energization of said motor, de-energization of said motor causing disengagement of said spiral tooth with said gear means, said concaved face of said spiral gear means meshing uniformly with said gear means so as to substantially prevent crowning of said gear means, one revolution of said spiral gear advancing said gear means one tooth space of said gear means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

7. In a time sequence switch for accomplishing a plurality of timing sequences, a drive motor providing a substantially constant rotary motion output including rotor means displaced from the stator means by bias means so that energization of said motor causes said rotor means to be displaced to a determined position with respect to said stator means, spiral gear means carried by said rotor means including a plurality of Archimedes' spiral teeth formed thereon having an arcuate extent in excess of 360 degrees, said spiral teeth having a common axis with said rotor means, said spiral teeth engaging with a plurality of teeth of and rotatably driving gear means after displacement of said rotor means with respect to said stator means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

8. In a time sequence switch for accomplishing a plurality of timing sequences, a drive motor providing a substantially constant rotary motion output including rotor means displaced from the stator means by bias means so that energization of said motor causes said rotor means to be displaced to a determined position with respect to said stator means, spiral gear means carried by said rotor means including a plurality of Archimedes' spiral teeth formed thereon having an arcuate extent in excess of 360 degrees, said spiral teeth having a common axis with said rotor means and having a rotational speed determined by the pitch of said spiral tooth, gear means disposed at substantially a right angle with respect to said spiral gear means, said spiral teeth engaging with a plurality of teeth of and rotatably driving gear means after displacement of said rotor means with respect to said stator means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

9. In a time sequence switch for accomplishing a plurality of timing sequences, a drive motor providing a substantially constant rotary motion output including rotor means displaced from the stator means by spring bias means so that energization of said motor causes said rotor means to be displaced to a determined position with respect to said stator means, spiral gear means carried by said rotor means having a concaved face including a plurality of Archimedes' spiral teeth formed thereon having an arcuate extent in excess of 360 degrees, said spiral teeth having a common axis with said rotor means and having a rotational speed determined by the pitch of said spiral tooth, gear means disposed at substantially a right angle with respect to said spiral gear means, said spiral teeth engaging with a plurality of teeth of and rotatably driving gear means after displacement of said rotor means with respect to said stator means, said concaved face of said spiral gear means meshing uniformly with said gear means so as to substantially prevent crowning of said gear means, an escapement means connected to said gear means for translating said substantially constant rotary motion of said gear means to an intermittent rotary motion output, and a cam-carrying shaft connected to said intermittent rotary motion output of said escapement means intermittently displaced in determined increments by said escapement.

References Cited

UNITED STATES PATENTS

| | | | |
|---|---|---|---|
| 609,361 | 8/1898 | McKean | 74—412 X |
| 1,245,621 | 11/1917 | Schmick | 74—424.5 |
| 1,422,000 | 7/1922 | Schmick | 74—424.5 |
| 1,595,823 | 8/1926 | Dunn et al. | 74—424.5 |
| 1,675,958 | 7/1928 | Reynolds | 74—405 X |
| 2,405,473 | 8/1946 | Valentine | 74—424.5 |
| 2,503,146 | 4/1950 | Anketell | 74—405 |
| 3,000,469 | 9/1961 | Froehlich | 74—405 X |
| 3,168,840 | 2/1965 | Williams | 74—472 |

FOREIGN PATENTS 627,505  10/1927  France.

DONLEY J. STOCKING, *Primary Examiner.*

L. H. GERIN, *Assistant Examiner.*